United States Patent [19]

Klein et al.

[11] Patent Number: 4,977,115

[45] Date of Patent: Dec. 11, 1990

[54] THIXOTROPIC REFRACTORY MATERIAL AND A PROCESS AND APPARATUS FOR LINING METALLURGICAL VESSELS WITH THIS MATERIAL BY A VIBRATION METHOD

[75] Inventors: Walter Klein, Essen; Irmelin Wolf, Urbar, both of Fed. Rep. of Germany

[73] Assignee: Martin & Pagenstecher GMBH, Cologne, Fed. Rep. of Germany

[21] Appl. No.: 902,354

[22] Filed: Aug. 29, 1986

Related U.S. Application Data

[63] Continuation of Ser. No. 716,898, Mar. 28, 1985.

[30] Foreign Application Priority Data

Dec. 14, 1984 [DE] Fed. Rep. of Germany ....... 3445559

[51] Int. Cl.$^5$ .............................................. C04B 35/48
[52] U.S. Cl. .................................................... 501/107
[58] Field of Search ................................ 501/106, 107

[56] References Cited

U.S. PATENT DOCUMENTS

| | | | |
|---|---|---|---|
| 4,069,057 | 1/1978 | Kamei et al. | 106/55 |
| 4,212,680 | 7/1980 | Schulz | 106/65 |
| 4,222,782 | 9/1980 | Alliegro et al. | 106/57 |
| 4,292,084 | 9/1981 | Thrower et al. | 501/107 |
| 4,308,067 | 12/1981 | Guigonis et al. | 501/105 |
| 4,326,040 | 4/1982 | Kaji et al. | 501/100 |
| 4,508,835 | 4/1985 | Kaniuk et al. | 501/94 |
| 4,568,007 | 2/1986 | Fishler | 164/437 |
| 4,623,131 | 11/1986 | Roberts | 266/280 |

OTHER PUBLICATIONS

"Manufacture and Use of Hungarian Electrofused Refractory Products", W. Harrach, Presented at the Hungarian Industrial Gathering, Oct. 20, 1970, Dusseldorf. MOTIM, AB Hungalu-Zirkosit-K, Motim's Wear-Resistant Material, 5 pages.

*Primary Examiner*—Olik Chaudhuri
*Assistant Examiner*—Andrew Griffin
*Attorney, Agent, or Firm*—Sprung, Horn, Kramer & Woods

[57] ABSTRACT

The invention relates to a thixotropic self-curing refractory material based on zirconium silicate, and a process and an apparatus for lining metallurgical vessels, in particluar ladles in steel plants, with this material which is compacted by means of a vibration method.

6 Claims, 1 Drawing Sheet

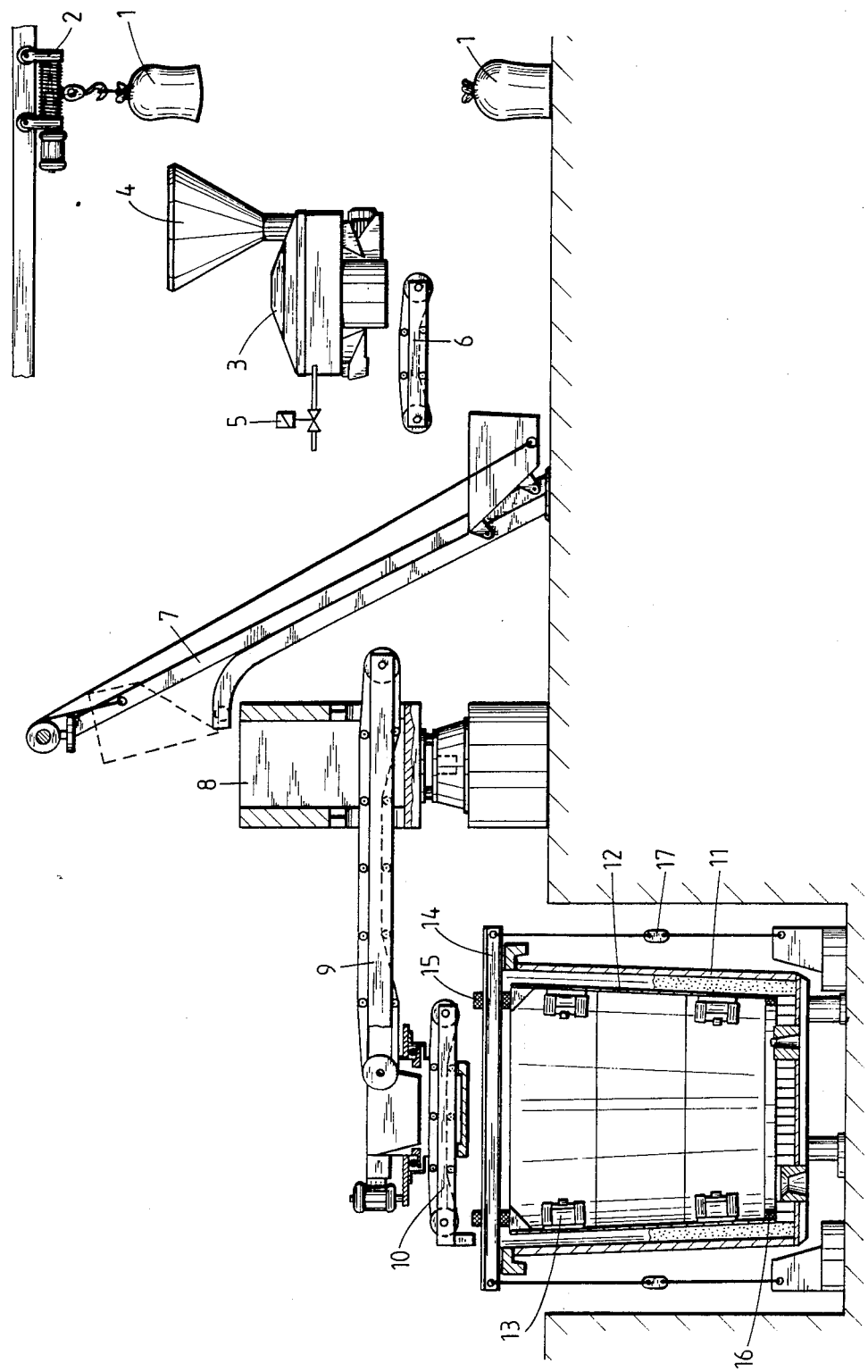

THIXOTROPIC REFRACTORY MATERIAL AND A PROCESS AND APPARATUS FOR LINING METALLURGICAL VESSELS WITH THIS MATERIAL BY A VIBRATION METHOD

This is a continuation, of application Ser. No. 716,898, filed Mar. 28, 1985, now pending.

BACKGROUND OF THE INVENTION

The property of suitable refractory materials, known as thixotropy whereby the materials become liquid when subjected to vibrations and are converted to a solid state when the vibration ends, is utilised for lining metallurgical vessels with vibration of the lining material.

This lining technique has been introduced into the steel industry for lining tapping spouts in blast furnaces. The thixotropic refractory material is introduced into the tapping spout, caused to flow with the aid of a vibration template, and homogenised and compacted.

This technique has also been used in the foundry industry for lining ladles which are not very high. It has also been proposed to line ladles in steel plants in this manner. In lining ladles in steel plants, however, the lining predominantly used are either linings with refractory bricks or monolithic linings obtained by ramming or slinging refractory compounds. The reason is that the refractory lining of ladles, in which metallurgical treatments of the melt are also frequently carried out today, has to meet high requirements in respect of their durability. The refractory lining of ladles is destroyed predominantly by infiltration and slagging.

The liquid slags and the melt infiltrate the refractory lining, where reactions take place between slags/melt and the refractory material of the lining, these reactions resulting in destruction of the refractory lining. In addition to the refractoriness and the mineral composition, the density of the refractory thixotropic compound used is important with regard to the slag resistance of the refractory lining. Specialists have hitherto apparently been of the opinion that, in the case of ladles in steel plants, an adequate density of the refractory lining cannot be achieved by vibration.

Furthermore, steel ladles which today usually have capacities of from 80 to 320 tons possess linings which are 3 m high or more. With these lining heights, specialists are troubled not only by the problem of an adequate density of the lining, but also by the possibility that the lining which has been subjected to vibration will not itself possess sufficient strength after removal of the template and will collapse.

The compound disclosed as a refractory compound for lining ladles in steel plants is a pourable compound whose principal components are zirconium silicate, a siliceous raw material, for example fireclay, and an alumina binder, the total alumina content of the pourable material being restricted to 5–1.0% by weight (German Auslegeschrift No. 3,235,244, and Nippon Kokan Technical Report, Overseas No. 37, 1983, pages 51 to 53). A disadvantage is the relatively high porosity of 16.5 to 21.5 vol. % and the consequent insufficient slag resistance owing to greater infiltration. Furthermore, as a result of adding fireclay, the lining tends to shrink and is consequently susceptible to fracture. As a result of using an alumina binder, the compound contains water of crystallisation. It also contains free $SiO_2$. This is disadvantageous because $SiO_2$ is reduced in the presence of manganese-containing melts, and siliconisation of the steel occurs.

U.S. Pat. No. 4,292,084 discloses a refractory material for lining metallurgical vessels by vibrating the material to compact it, which can consist of zirconium silicate, tabular alumina, calcined kaolin and phosphoric acid.

These known compounds, however, have bulk densities of only between 2.35 and 2.50 g/cm$^3$. Therefore the slag resistance must be considered insufficient. Because of the high water content of between 6.4 and 7.1%, the lining might collapse after it has been produced by the vibration process and the former has been withdrawn.

SUMMARY OF THE INVENTION

It is the object of the present invention to propose a thixotropic self-curing refractory material for vibration compaction with which the stated disadvantages of the known materials can be overcome. In particular, the intention is to improve the infiltration-resistance and slag-repellant action of the lining, as well as its stability under load.

This object is achieved, in accordance with the invention, by a thixotropic self-curing refractory material based on zirconium silicate, and having the following chemical composition (in % by weight):

| | |
|---|---|
| 24 to 29% | $SiO_2$ |
| 10 to 20% | $Al_2O_3$ |
| 0,2 to 0,8% | $P_2O_5$ |
| 0 to 1,5% | $K_2O + Na_2O + LiO_2$ |
| 0 to 0,5% | $Fe_2O_3$ |
| 0 to 0,05% | $CaO$ |
| rest | $ZrO_2$ |

DETAILED DESCRIPTION OF THE INVENTION

It is a main object of the invention to counter the attack by slag on the refractory material and the consequences of this attack, by suitable measures both in terms of the structure (mineralogical composition) and in terms of the texture (density, gas permeability, particle size distribution and porosity). According to the invention the refractory material should preferably have the following crystallographic analysis (in % by weight):

| | |
|---|---|
| 20 to 30% | fused zirconium silicate/corundum |
| 1 to 5% | alumina |
| 0,1 to 0,5% | amorphous silica |
| 0,3 to 1% | aluminum metaphosphate |
| 0,5 to 4% | alkalisilicate with a molar ratio of 1:2 to 1:4 |
| rest | zirconium silicate |

When the molar ratio is greater than 1:2, the alkali metal silicates become too hygroscopic. When the molar ratio is less than 1:4, the alkali metal silicates become water-insoluble. "Molar ratio" is the ratio of the alkali metals to the silicate part of alkali metal silicates.

The zirconium silicate should preferably have the following particle size spectrum:

| | |
|---|---|
| 1 to 10% | 0,001 to 0,01 mm |
| 17 to 25% | 0,01 to 0,074 mm |

| 65 to 82% | 0,074 to 0,5 mm |

It is advantageous if a product having the following chemical composition (in % by weight) is used as the fused zirconium silicate/corundum:

| 13 to 18% | SiO₂ |
| 32 to 37% | ZrO₂ |
| rest | Al₂O₃ |

The fused product should preferably possess a bulk density of at least 3.60 g/cm³ and a total porosity of 8% or less.

The alumina used should preferably be reactive α-alumina which has a mean primary particle size of less than 3.5 μm and in which at least 45% of the particles have a size of less than 2 μm.

Advantageously, 0.5 to 3% by weight of antioxidants, preferably in the form of aluminum and/or silicon particles, can be added to the material.

It may also be advantageous to add pulverulent wetting agents, preferably alkyl-aryl-polyoxyethanol, which reduce the surface tension of the water for mixing. The amount added is 0.05 to 0.2% by weight.

The amount of water for mixing should be in the range of 2.5 to 3.5 kg per 100 kg of dry compound. A further object of the invention is to propose a suitable process and an apparatus for lining metallurgical vessels, with the thixotropic refractory material according to the invention by a vibration method.

In this process for lining metallurgical vessels, in particular ladles in steel plants, with the new thixotropic self-curing refractory material by a vibration method, the components of the material in the dry state are first mixed thoroughly. Water is added and the wetted material is mixed again. The material is then introduced under continuous vibration into the space between a former inserted in the ladle and the ladle wall. After removal of the former, the lining is heated for drying.

In a preferred embodiment, the amount of water for mixing is added with a precision of at least 0.1%, and the moist material is mixed for not more than 4 minutes.

After removal of the former, the lining is heated, preferably to about 150° C., at a maximum rate of 8° C./hour.

The apparatus according to the invention comprises a compulsory mixer with a water-metering unit with electrical pulse control for mixing and moistening the dry material, a rotating belt-type conveyor, and a vibration template with one or more vibrators.

Advantageously the product has the following particle size spectrum:

| 26 to 32% | 0 to 0.06 mm |
| 32 to 52% | 0.06 to 0.5 mm |
| 23 to 38% as rest | 0.5 to 3 mm, | and the zirconium silidale has the following particle size spectrum:

| 1 to 10% | 0.001 to 0.01 mm |
| 17 to 25% | 0.01 to 0.074 mm |
| 65 to 82% | 0.74 to 0.5 mm. |

The invention is illustrated by the following examples.

EXAMPLE 1

A thixotropic self-curing vibration-compacted refractory material according to the invention with the composition given below in % by weight was used for lining a steel ladle having a capacity of 85 tons:

36% zirconium silicate having a particle size of up to 0.5 mm,

16% zirconium silicate having a particle size of up to 0.074 mm,

10% zirconium silicate having a particle size between 0.001 and 0.01 mm,

30% fused zirconium silicate/corundum having a particle size of up to 4 mm,

5% α-alumina having a mean primary particle size of less than 3.5 μm and 0.5% amorphous silica having a particle size of less than 1 μm.

The fused zirconium silicate/corundum employed had the following composition:

16% SiO₂
48% Al₂O₃
36% ZrO₂.

The bulk density of the fused particles is 3.65 g/cm³ and the total porosity is 7%.

The refractory components in the dry state were mixed thoroughly in a mixer, with the addition of (in % by weight)

0.5% aluminum metaphosphate powder,

1% sodium silicate having a molar ratio of 1:2.5, 0.5% aluminum powder as an antioxidant, and 0.05% a detergent substance as wetting agent.

The material was packed in plastic big bags.

The chemical analysis of the material is given below (in % by weight):

| 25% | SiO₂ |
| 20% | Al₂O₃ |
| 0.35% | P₂O₅ |
| 0.8% | Na₂O |
| rest | ZrO₂. |

The material is free of clay and free of cement and therefore does not contain any crystallisation water. The content of free SiO₂ is less than 0.5% by weight.

In a ladle lined with this material, desulphurisation treatments with lime-containing substances can be carried out with improved results, and high-manganese steels can be cast.

In the steel plant, the dry material is introduced into a compulsory mixer in batches of 2 tons each and is mixed thoroughly, with the addition of 3.4 kg of water for mixing per 100 kg of dry compound. Exact metering of water is effected by means of electric pulse control, the precision being 0.1%. The mixing time after the addition of water is 4 minutes. The material is then discharged from the mixing apparatus and is transported to the steel ladle to be lined; the introduction of the material into the space between an inserted former and the ladle wall, and the vibration procedure, are carried out within a period of 4 minutes.

After the vibration procedure, the former is removed. The lining is then heated up to 150° C. at a rate of slower than 8° C./hour and than brought to the operating temperature.

The ready-prepared lining has the following properties:

| | |
|---|---|
| Vibration density (bulk density): | 3.6 g/cm$^3$ |
| Open porosity: | 12 vol. % |
| Gas permeability: | 0.4 nPm |
| Thermal expansion up to 1.000° C.: | 0.4% |
| Compressive strength in the cold state after heating to 1.000° C.: | 100 N/mm$^2$ |

When stainless steel melts were treated in such a lined ladle, the life of the lining corresponded to 78 heats; this is 1.75 times the life of a lining produced using a similar, but rammed, material.

EXAMPLE 2

A thixotropic self-curing vibration material according to the invention, for lining a steel ladle having a capacity of 180 tons, contains the following refractory components:

50% by weight of zirconium silicate having a particle size of 0–0.5 mm,

15% by weight of powdered zirconium silicate having a particle size of 0–0.074 mm, 10% by weight of powdered zirconium silicate having a particle size of 0.001–0.01 mm, 20% by weight of fused zirconium silicate/corundum having a particle size of 0–4 mm, 2% by weight of α-alumina having a mean primary particle size of less than 3.5 μm and 0.2% by weight of amorphous silica having a particle size of less than 1 μm.

The fused zirconium silicate/corundum employed has the following chemical composition (in % by weight): 16% of $SiO_2$, 48% of $Al_2O_3$ and 36% ZrO. The bulk density of the particles is 3.65 g/cm$^3$, and the total porosity is 7%.

The refractory components in the dry state are mixed thoroughly in a compulsory mixer, with the addition of (in % by weight):

| | |
|---|---|
| 0.5% | aluminum metaphosphate powder, |
| 1.3% | sodium silicate having a molar ratio of 1:3.3, |
| 0.9% | aluminum powder as an antioxydant and |
| 0.1% | a detergent substance as a wetting agent. |

The material is packed in plastic big bags.

The chemical analysis of the material is as follows (in % by weight):

| | |
|---|---|
| 37% | $SiO_2$ |
| 13% | $Al_2O_3$ |
| 0.35% | $P_2O_5$ |
| 0.6% | $Na_2O$ |
| rest | $ZrO_2$ |

This compound too is clay-free and cement-free. The content of free $SiO_2$ is less than 0.5%.

In the steel plant, the dry material is introduced into a compulsory mixer in batches of 2 tons each and is mixed thoroughly, with the addition of 3.5 kg of water for mixing per 100 kg of dry compound. Exact metering of water is carried out by means of electrical pulse control, the precision being 0.1%. The mixing time after the addition of water is 4 minutes. The compound is then discharged from the mixing apparatus and is transported to the steel ladle to be lined. The introduction of the material into the space between an inserted former and the ladle wall, and the vibration procedure, are carried out within a period of 4 minutes.

After the vibration procedure, the former is removed. The lining is then heated up to 150° C. at a rate of less than 8° C./hour and then brought to the operating temperature.

The ready-prepared lining has the following properties:

| | |
|---|---|
| Vibration density (bulk density): | 3.65 g/cm$^3$ |
| Open porosity: | 11 vol. % |
| Gas permeability: | 0.4 nPm |
| Thermal expansion at 1000° C.: | 0.4% |
| Compressive strength in the cold state after heating to 1000° C.: | 110 N/mm$^2$. |

When high-grade steel melts were subjected to a treatment comprises desulphurization of the steel, lifetime corresponded to 70 heats. This is 1.2 times the life of a lining produced using a vibrated high-alumina compound of greater porosity.

DESCRIPTION OF THE DRAWINGS

The drawing shows diagrammatically an embodiment of an apparatus for carrying out the process according to the invention.

The dry vibration material, which is supplied in plastic big bags, is poured into the compulsory mixer 3 via the hopper 4, by means of an overhead crane 2, the compulsory mixer being equipped with a water-metering unit 5. The material is mixed thoroughly in the compulsory mixer 3, the amount of water for mixing being added with the aid of the water metering unit 5, with a precision of at least 0.1%.

After the material has been mixed and moistened, it is discharged from the compulsory mixer 3 with the aid of the conveyor belt 6 and is transported into the bunker 8 by means of the inclined lift 7. From the silo 8, the material passes onto a conveyor belt 9, the end of which is equipped with a rotating belt conveyor 10.

The vibration former 12 with the vibrators 13 is located in the steel ladle 11 to be lined. The former 12 rests on an annular rubber cushion 16, while the upper cushioning against a crosshead 14 is effected by means of a plurality of upper and lower rubber cushions 15.

The crosshead 14 is connected to the ladle by means of fastenings 17. The rotating belt conveyor 10 transports the material into the gap between the ladle 11 and the vibration former 12. When the vibrators 13 are switched on, the thixotropix refractory material becomes liquid under vibration and uniformly fills the space between the ladle 11 and the former 12. When the filling process is completed and the vibrators have been switched off, the refractory material becomes solid.

The heat treatment after removal of the vibration former 12 has been described above in the examples.

We claim:

1. A refractory material based on zirconium silicate for lining metallurgical vessels by the vibration method which is free of clay and cement, and on a dry basis consists essentially of the following chemical composition

| | |
|---|---|
| 24 to 29% | $SiO_2$ |
| 10 to 20% | $Al_2O_3$ |
| 0.2 to 0.8% | $P_2O_5$ |
| maximum 1.5% | $K_2O + Na_2O + LiO_2$ |

| | |
|---|---|
| maximum 0.5% | Fe₂O₃ |
| maximum 0.05% | CaO |
| rest | ZrO₂, | having a bulk density of at least 3.6 g/cm³, having the following analysis (in % by weight):

| | |
|---|---|
| 20 to 30% | fused zirconium silicate/corundum |
| 1 to 5% | alumina |
| 0.1 to 0.5% | amorphous silica |
| 0.3 to 1% | aluminum metaphosphate |
| 0.5 to 4% | alkalisilicate with a molar ratio of 1:2 to 1:4 |
| rest | zirconium silicate, and having the following particle size spectrum: |
| 26 to 32% | 0 to 0.06 mm |
| 32 to 52% | 0.06 to 0.5 mm |
| 23 to 38% | 0.5 to 3 mm, | said material in admixture with water being thixotropic and self-curing.

2. A refractory material based on zirconium silicate for lining metallurgical vessels by the vibration method which is free of clay and cement, and on a dry basis consists essentially of 0.5 to 3% by weight of an antioxidant with the balance consisting essentially of the following chemical composition (in % by weight):

| | |
|---|---|
| 24 to 29% | SiO₂ |
| 10 to 20% | Al₂O₃ |
| 0.2 to 0.8% | P₂O₅ |
| maximum 1.5% | K₂O + Na₂O + LiO₂ |
| maximum 0.5% | Fe₂O₃ |
| maximum 0.05% | CaO |
| rest | ZrO₂, | having a bulk density of at least 3.6 g/cm³, having the following analysis (in % by weight):

| | |
|---|---|
| 20 to 30% | fused zirconium silicate/corundum |
| 1 to 5% | alumina |
| 0.1 to 0.5% | amorphous silica |
| 0.3 to 1% | aluminum metaphosphate |
| 0.5 to 4% | alkali silicate with a molar ratio of 1:2 to 1:4 |
| rest | zirconium silicate, and | having the following particle size spectrum:

| | |
|---|---|
| 26 to 32% | 0 to 0.06 mm |
| 32 to 52% | 0.06 to 0.5 mm |
| 23 to 38% | 0.5 to 3 mm, | said material in admixture with water being thixotropic and self-curing.

3. A refractory material based on zirconium silicate for lining metallurgical vessels by the vibration method which is free of clay and cement, and on a dry basis consists essentially of 0.05 to 0.2% by weight of a pulverulent wetting agent with the balance consisting essentially of the following chemical composition (in % by weight):

| | |
|---|---|
| 24 to 29% | SiO₂ |
| 10 to 20% | Al₂O₃ |
| 0.2 to 0.8% | P₂O₅ |
| maximum 1.5% | K₂O + Na₂O + LiO₂ |
| maximum 0.5% | Fe₂O₃ |
| maximum 0.05% | CaO |
| rest | ZrO₂, | having a bulk density of at least 3.6 g/cm³, having the following analysis (in % by weight):

| | |
|---|---|
| 20 to 30% | fused zirconium silicate/corundum |
| 1 to 5% | alumina |
| 0.1 to 0.5% | amorphous silica having a particle size < 1 um |
| 0.3 to 1% | aluminum metaphosphate |
| 0.5 to 4% | alkali silicate with a molar ratio of 1:2 to 1:4 |
| rest | zirconium silicate, and | having the following particle size spectrum:

| | |
|---|---|
| 26 to 32% | 0 to 0.06 mm |
| 32 to 52% | 0.06 to 0.5 mm |
| 23 to 38% | 0.5 to 3 mm, | said material in admixture with water being thixotropic and self-curing.

4. A refractory material according to claim 1, wherein the zirconium silicate has the following particle size spectrum:

| | |
|---|---|
| 1 to 10% | 0.001 to 0.01 mm |
| 17 to 25% | 0.01 to 0.074 mm |
| 65 to 82% | 0.074 to 0.5 mm. |

5. A refractory material according to claim 1, wherein the fused zirconium silicate/corundum has the following chemical composition (in % by weight):

| | |
|---|---|
| 13 to 18% | SiO₂ |
| 32 to 37% | ZrO₂ |
| rest | Al₂O₃ | and a total porosity of 8% or less, and the particles possess a bulk density of at least 3.60 g/cm³.

6. A refractory material according to claim 1, wherein the alumina is reactive α-alumina which has a mean primary particle size of less than 3.5 μm and in which at least 45% of the particles are less than 2 μm in size, and the silica used is colloidal silica having a particle size of less than 1 μm.

* * * * *

UNITED STATES PATENT AND TRADEMARK OFFICE
CERTIFICATE OF CORRECTION

PATENT NO. : 4,977,115

DATED : December 11, 1990

INVENTOR(S) : Klein et al.

It is certified that error appears in the above-identified patent and that said Letters Patent is hereby corrected as shown below:

Col. 6, lines 62-  After " composition " insert -- (in % by weight): --

Signed and Sealed this

Twenty-ninth Day of December, 1992

*Attest:*

DOUGLAS B. COMER

*Attesting Officer*    Acting Commissioner of Patents and Trademarks